Nov. 7, 1967 C. G. TINSLEY 3,351,846

CONSTANT POWER GENERATOR

Filed Jan. 15, 1964

INVENTOR.
Carl G. Tinsley

BY Mueller & Aichele

ATTYS.

3,351,846
Patented Nov. 7, 1967

3,351,846

CONSTANT POWER GENERATOR

Carl G. Tinsley, Scottsdale, Ariz., assignor to Motorola, Inc., Chicago, Ill., a corporation of Illinois Filed Jan. 15, 1964, Ser. No. 337,920
6 Claims. (Cl. 323—1)

Figures 1, 2:
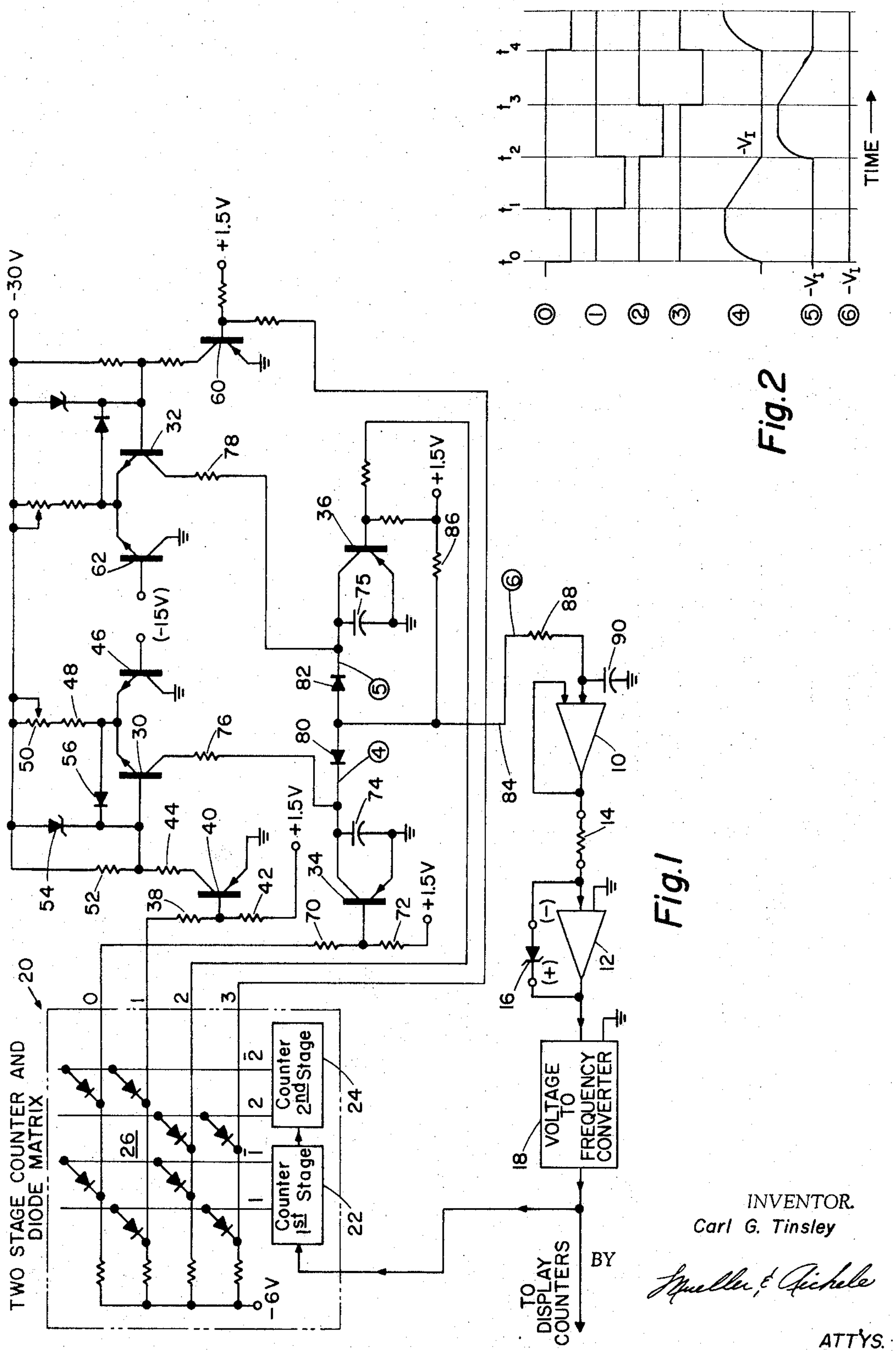

The present invention relates to signal generating apparatus, and it relates more particularly to a signal generator which is constructed to maintain constant output power in the presence of varying output voltage.

The generator of the present invention is particularly suited for use in test equipment, although its utility is not limited to such a use. The generator can be used, for example, for measuring the Zener voltage of diodes, where the test point is specified as a power level for a particular system without regard to voltage. For that purpose the system must control the current through the Zener diode as an inverse function of the voltage thereacross so as to maintain constant power dissipation.

The constant power generator to be described measures the direct-current voltage across the device being tested (such as a Zener diode) by means of a voltage-to-frequency converter. The converter itself is a commercial item. Voltage-frequency converters may be obtained, for example, from the Hewlett-Packard Co. (Dymec Division) in Palo Alto, Calif. The voltage-frequency converter generates pulses having a repetition rate which is a function of the applied voltage. These pulses are applied to a network which responds to the time interval between successive pulses to establish the current passing through the device being tested, as an inverse function of the voltage across the device. The result is a constant power dissipated in the device. This constant power, in the embodiment to be described, is dissipated over a considerable voltage range, of the order, for example, of 30–1.

It is an object of the present invention, therefore, to provide a signal generator which is conceived and constructed so that the power dissipated by a device under test remains constant for changes in voltage across the device.

Another object of the invention is to provide such an improved constant power signal generator which is precise and accurate in its operation.

Yet another object of the invention is to provide such an improved constant power signal generator which is not subject to damage to itself or to the device being tested, due to electric overload, since the power dissipated automatically adjusts to different load conditions.

A still further object of the invention is to provide such an improved signal generator which is capable of responding rapidly to load changes so as to maintain constant power dissipation despite rapid changes in the voltage across the device being tested.

For example, in a constructed embodiment of the invention, the power is reset to a selected constant level within two cycles of the output of the aforesaid voltage-frequency converter. This is the equivalent of 6 milliseconds on a 6-volt unit, using frequency converter which develops an output of 50 cycles per volt.

Other objects, features and advantages of the invention will become apparent from a consideration of the following specification, when the specification is considered in conjunction with the accompanying drawing, in which:

FIGURE 1 is a diagram, partly in circuit detail and partly in block form, illustrating one embodiment of the constant power generator of the present invention; and FIGURE 2 is a series of curves representative of waveforms developed at different points within the system of FIGURE 1.

The constant power generator system illustrated in FIGURE 1 includes a pair of operational amplifiers 10 and 12. A resistor 14 is interposed between the operational amplifiers. The test device, such as a Zener diode 16, for example, is connected across the terminals of the operational amplifier 12.

The output of the operational amplifier 12 is applied to a voltage-to-frequency converter 18. This converter, for example, may be a Hewlett-Packard Model 2211–B. As mentioned above, the voltage-frequency converter 18 develops output pulses having a repetition frequency which is a function of the voltage across the Zener diode 16. The output from the voltage-frequency converter may be introduced to appropriate display counters (not shown).

The output from the voltage-frequency converter 18 is also applied to a two-stage counter and diode matrix 20. The counter includes a first stage, designated by a block 22, and it includes a second stage designated by a block 24. The two-stage counter 22, 24 may be connected in known manner, so as to respond to the output pulses from the converter 18.

The counter stage 22 responds to each of the output pulses from the converter 18, in known manner, so as to provide a usual 1, $\bar{1}$ output. The second stage 24 responds to every second pulse, in usual binary counter manner, so as to provide a 2, $\bar{2}$ output. The outputs from the counter stages 22 and 24 are applied to an appropriate diode matrix 26 in the block 20. The diode matrix includes output terminals designated 0, 1, 2 and 3. Successive pulses from the converter 18, produce rectangular waveform signals (such as shown in the curves 0, 1, 2 and 3 of FIGURE 2) across the corresponding output terminals of the block 20.

As shown in FIGURE 1, the rectangular wave output signals 1 and 3 energize corresponding constant current charging circuits which incorporate respective NPN transistors 30 and 32. The rectangular wave output signals 0 and 2, on the other hand, are introduced to respective discharge circuits associated with PNP transistors 34 and 36 respectively.

The gate output terminal 1 is connected through a 1 kilo-ohm resistor 38, to the base of a grounded emitter PNP transistor 40, the base being returned to the positive terminal of a 1.5-volt direct voltage source through a 3.3 kilo-ohm biasing resistor 32. The transistor 40 is connected as a grounded emitter amplifier.

The collector of the transistor 40 is connected through a 4.7 kilo-ohm resistor 44 to the base of the transistor 30. The emitter of the transistor 30 is connected to the emitter of an NPN transistor 46. The transistors 30 and 46 are connected as a differential amplifier. The collector of the transistor 46 is grounded, and its base is connected to the negative terminal of a 15-volt direct voltage source.

The emitters of the transistors 30 and 46 are connected to the negative terminal of a 30-volt source through a 2.7 kilo-ohm resistor 48 and through a 500 ohm potentiometer 50. The base of the transistor 30 is connected to that negative terminal through a 22 kilo-ohm resistor 52, which is shunted by a Zener diode 54. The Zener diode establishes a constant voltage between the base of the transistor 30 and the supply voltage so that the emitter current is constant. The collector current of the transistor 30, likewise, is essentially constant. The resulting circuit is a simple constant current generator. A diode 56 is connected between the emitter and base of the transistor 46 to prevent the emitter from swinging positive with respect to the base.

The terminal 3 of the block 20 is connected to the circuitry of a PNP transistor 60. This latter circuitry is a grounded emitter transistor amplifier similar to that associated with the transistor 40. Likewise, the circuitry associated with the transistor 32 is similar to that associated with the transistor 30, described above. A transistor 62, equivalent to the transistor 46 is connected into the circuit of the transistor 32, to constitute a differential amplifier therewith.

The aforementioned connection of the terminal 0 of the block 20 to the transistor 34 is through a 1 kilo-ohm resistor 70, and a similar connection is made from the output terminal 2 to the base of the transistor 36. The transistors 34 and 36 are connected as discharge circuits; as will be explained. A bias resistor 72 of, for example, 3.3 kilo-ohms, connects the base of the transistor 34 to the positive terminal of the 1.5-volt source. A similar resistor is connected to the base of the transistor 36. A capacitor 74 is shunted across the collector and emitter of the transistor 34, this capacitor having a capacity, for example, of 1 microfarad. A similar capacitor 75 is shunted across the transistor 36. The collector of the transistor 34 is connected through a 100 ohm resistor 76 to the capacitor 74 so as to provide a charging path to the capacitor. The collector of the transistor 36 is connected through a similar resistor 78 to the capacitor 75 so as to provide a charging path to the capacitor 75.

The collectors of the transistors 34 and 36 are connected through respective diodes 80, 82 to a common lead 84. The lead 84 is connected through a resistor 86 to the positive terminal of the 1.5 volt source. The resistor 86 is adjusted to match the two diode voltage drops with the transistor (34 and 36) saturation voltages. The lead 84 is connected through a smoothing filter, including a resistor 88 and grounded capacitor 90, to the input of the operational amplifier 10.

The fundamental relationship between frequency and time is $$t=\frac{1}{f}$$

where:

$t$ is the time interval between successive pulses, and
$f$ is the repetition frequency of the pulses.

Since the repetition frequency ($f$) of the pulses from the converter 18 is proportional to the voltage applied thereto by the operational amplifier 12, then if we make the resulting current proportional to the period T, or the time between successive pulses, the product of current and voltage, that is, the power dissipated, will always be constant.

Another fundamental relationship used in the system of the invention is that the voltage established across a capacitor as the capacitor is charged, is the time integration of current. The simplest case is where a constant current is fed into a capacitor, resulting in a linear increase in voltage, so that the voltage is directly proportional to the time the constant current is applied. The equation reduces to $$V=\frac{TI}{C}$$

where:

V is the voltage across the capacitor,
T is the time in seconds,
I is the value of the constant current, and
C is the capacitor value in farads.

In the operation of the system, the operational amplifier 12 applies a varying voltage to the converter 18. It is obvious that in order to obtain constant power, the product of voltage and current must be constant. To obtain the accuracy needed, a digital voltmeter should be used. The voltage-to-frequency converter 18 actually represents one type of digital voltmeter. This converter, as explained above, converts the voltage applied to it by the operational amplifier 12 into a series of pulses whose repetition frequency is directly proportional to the input voltage.

The pulses from the voltage-to-frequency converter 18 are applied to the counter 22. This counter, in conjunction with the counter 24 and with the diode matrix 26 provide successive signals at the terminals 0, 1, 2 and 3 of the block 20. These signals have a rectangular waveform, as shown by the curves 0–3 of FIGURE 2. The rectangular wave signals of these curves occur successively at the different terminals, as shown, and each has a period corresponding to the time interval between successive pulses from the converter 18.

The rectangular wave signal 1 is amplified by the circuit of the transistor 40, and this signal is applied to the differential amplifiers of the transistors 30, 46. As mentioned above, the transistors 30 and 46 are connected as a constant current generator, and a constant current is supplied to the capacitor 74 through the resistor 76 during the negative-going portions of the rectangular wave signal 1.

The signal 0, on the other hand, is applied to the transistor 34 in the discharge circuit of the capacitor 74. During the negative-going portions of the latter signal, the capacitor 74 is caused to discharge. This action is shown in the curves of FIGURE 2. During the negative-going portions of the signal 0, for example, the capacitor 74 discharges, as shown by the curve 4 of FIGURE 2, and its potential rises from a negative value to the ground level.

Immediately following a negative-going portion of the signal 0, the signal 1 goes negative, so that the capacitor 74 begins to charge in a negative direction.

The negative voltage across the capacitor 74, due to the constant current versus constant voltage characteristics of the charging capacitor 74, is directly proportional to the period of the negative-going portions of the signal 1. The capacitor 74, therefore, is charged to a particular negative potential value, until it is next discharged by the action of the circuit of the transistor 34 in response to the signal 0.

The same action occurs across the capacitor 75 during interposed intervals, as also shown by the curves of FIGURE 2. The diodes 80 and 82 serve as a selection means, so that only the more negative of the two capacitors 74 and 75 is effectively coupled to the input of the operational amplifier 10. Therefore, should the interval between successive pulses from the converter 18 change, the corresponding charge across the capacitors 74 and 75 also shifts, in a positive or a negative direction. This causes the direct-current voltage applied to the operational amplifier 10, to change as a direct proportion to the change in the interval between the pulses from the converter 18, and as an inverse function.

The direct-current voltage applied to the operational amplifier 10 is shown in the curve 6 of FIGURE 2. This voltage is susceptible to slight flutter conditions when switched between the circuits of the capacitors 74 and 75, and these are filtered out by the filter network formed by the resistor 88 and capacitor 90.

The transistor circuit of FIGURE 1, therefore, together with the counter circuit 20, serve to transform the intervals between successive pulses from the converter 18 into current. This current represents an inverse function of the voltage applied to the converter 18. The current is inversely proportional to the voltage, and it is converted to a control voltage by the circuit described above, which voltage is directly proportional to the current. This latter control voltage serves to control the current through the operational amplifier 12 and through the device 16 as an inverse function of the voltage, so as to achieve constant power.

The transistor circuitry described above represents a simple and relatively inexpensive constant power generator. The particular constant power generator of the illustrated circuitry has been found to be accurate within 1%. It is evident, of course, that other circuitry can be used in implementing the constant power generator.

In a constructed embodiment of the invention, the output of the voltage-frequency converter 18 is 50 cycles per volt. The operational amplifier 10 is connected as an emitter follower, and it serves to reduce the loading on the capacitors. The output of the operational amplifier 10 corresponds to the more negatively charged of the two capacitors 74 and 75. This, as described above, is a voltage directly proportional to the time interval between successive pulses from the frequency converter 18.

It will be appreciated that while a particular embodiment of the invention has been shown and described, modifications may be made. It is also to be understood that although the invention has been described in conjunction with a test circuit for Zener diodes, or the like, the system has general application wherever a constant power signal generator may be required.

The following claims are intended to cover all modifications which fall within the scope of the invention.

What is claimed is:

1. A constant power signal generating system including in combination: first circuit means responsive to an applied voltage for producing a periodic signal whose frequency is a function of the value of the applied voltage; second circuit means coupled to said first circuit means for applying said voltage thereto; and third circuit means coupled to said first and second circuit means and responsive to the periodic output signal from said first circuit means for producing a current in said second circuit means whose value is an inverse function of the frequency of said periodic signal.

2. A constant power signal generating system including in combination: a voltage-to-frequency converter responsive to an applied voltage for producing a series of pulses having a repetition frequency which is a function of the value of the applied voltage; first circuit means coupled to said converter for applying said voltage thereto; further circuit means coupled to said converter and responsive to the pulses therefrom for producing an output signal having an amplitude which is a function of the interval between successive ones of said pulses; and means coupled to said first circuit means and to said further circuit means and responsive to the output signal from said further circuit means for producing a current in said first circuit means whose value is an inverse function of the repetition frequency of said pulses.

3. A constant power signal generating system including in combination: a voltage-to-frequency converter responsive to an applied voltage for producing a series of pulses having a repetition frequency which is a function of the value of the applied voltage; first circuit means coupled to said converter for applying said voltage thereto; network means coupled to said converter for producing at least one signal having a period which is a function of the interval between successive ones of said pulses; further circuit means coupled to said network means and responsive to said signal therefrom for producing a direct-current voltage having an amplitude which is a function of the period of said last-named signal; and means coupled to said first circuit means and to said further circuit means and responsive to said direct-current voltage from said further circuit means for producing a current in said first circuit means whose value is an inverse function of the repetition frequency of said pulses.

4. A constant power signal generating system including in combination: a voltage-to-frequency converter responsive to an applied voltage for producing a series of pulses having a repetition frequency which is a function of the applied voltage; first circuit means coupled to said converter for applying said voltage thereto; counter network means coupled to said converter for producing four successive rectangular wave signals each having a period which is a function of the interval between successive ones of said pulses; first and second further circuit means coupled to said counter network means and respectively responsive to first and second pairs of said rectangular wave signals for producing a direct-current voltage having an amplitude which is a function of the period of each of said signals; and means coupled to said first circuit means and to said first and second further circuit means and responsive to said direct-current voltage therefrom for producing a current in said first circuit means whose value is an inverse function of the repetition frequency of said pulses.

5. The signal generating system defined in claim 4 in which each of said first and second further circuit means includes a capacitor, a constant current generator circuit responsive to one of said rectangular wave signals for charging said capacitor, and a discharge circuit responsive to a succeeding one of said rectangular wave signals for discharging said capacitor.

6. The signal generating system defined in claim 4 in which said first circuit means includes operational amplifier means.

References Cited

UNITED STATES PATENTS

| | | | |
|---|---|---|---|
| 2,960,662 | 11/1960 | Nelson | 330—128 |
| 2,968,001 | 4/1961 | Archer. | |
| 2,981,884 | 4/1961 | Tighe. | |
| 3,040,239 | 6/1962 | Walker | 323—24 |
| 3,134,073 | 5/1964 | Dickerson | 324—58 |
| 3,212,327 | 10/1965 | Burke | 73—141 |
| 3,243,689 | 3/1966 | Perrins. | |
| 3,252,078 | 5/1966 | Connor | 323—43.5 |

JOHN F. COUCH, *Primary Examiner.*

W. E. RAY, K. D. MOORE, *Assistant Examiners.*